(12) United States Patent
Garst, Jr. et al.

(10) Patent No.: US 8,341,614 B2
(45) Date of Patent: Dec. 25, 2012

(54) MEMORY MANAGEMENT FOR CLOSURES

(75) Inventors: Gerald Blaine Garst, Jr., Los Altos, CA (US); William Bumgarner, San Jose, CA (US); Fariborz Jahanian, Pleasanton, CA (US); Christopher Arthur Lattner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1121 days.

(21) Appl. No.: 12/242,519

(22) Filed: Sep. 30, 2008

(65) Prior Publication Data
US 2009/0307431 A1  Dec. 10, 2009

Related U.S. Application Data

(60) Provisional application No. 61/059,724, filed on Jun. 6, 2008.

(51) Int. Cl.
*G06F 9/45* (2006.01)
(52) U.S. Cl. .................................. 717/159; 717/120
(58) Field of Classification Search .......... 717/120–121, 717/124–133, 159–164
See application file for complete search history.

(56) References Cited

U.S. PATENT DOCUMENTS
7,111,294 B2 *  9/2006  Steensgaard .................. 718/100

OTHER PUBLICATIONS

Shapiro, "Closure Implementation in BitC", 2005, Systems Research Laboratory, Johns Hopkins University, 8 pages.*
Appel et al., "An Empirical and Analytic Study of Stack vs. Heap Cost for Languages with Closures", Jan. 1993, Journal of Functional Programming 1, pp. 1-27.*

* cited by examiner

*Primary Examiner* — Ted T Vo
(74) *Attorney, Agent, or Firm* — Blakely, Sokoloff, Taylor & Zafman LLP

(57) ABSTRACT

Methods, software media, compilers and programming techniques are described for creating copyable stack-based closures, such as a block, for languages which allocate automatic or local variables on a stack memory structure. In one exemplary method, a data structure of the block is first written to the stack memory structure, and this may be the automatic default operation, at run-time, for the block; then, a block copy instruction, added explicitly (in one embodiment) by a programmer during creation of the block, is executed to copy the block to a heap memory structure. The block includes a function pointer that references a function which uses data in the block.

19 Claims, 6 Drawing Sheets

COMPILER FLOW

MEMORY MANAGEMENT FOR CLOSURES

RELATED APPLICATIONS

This application claims the benefit of U.S. Provisional Patent Application No. 61/059,724, filed on Jun. 6, 2008, which is herein incorporated by reference.

BACKGROUND

This disclosure relates to memory management and memory allocation of data structures and functions.

The run-time organization of memory for a computer program often divides a system's memory into regions to store data used by the program. For example, a portion of the memory stores the executable software or code and another portion stores the variables, arguments, data, etc. used by the executable software or code. Often, local or automatic variables are stored in a stack memory structure and global variables are stored at fixed locations in a so-called global memory, and a heap memory structure can be used to store variables and other data. In programs written in C or C++ or Objective C or other C-like procedural languages, including Java, a run-time stack holds the local variables for the currently executing function or functions; each execution of a function may be referred to as an activation. The run-time stack holds the local variables for the currently executing activation as well as the activation or function which called the currently executing function. The currently executing function F1 has its data (e.g. local variables within the scope of function F1) at the top of the stack and just below the top of the stack is the data for the function F2 which called F1, and so on. Further information about stack usage can be found at pages 230-240 in the book *Mac OS X Internals—A Systems Approach* by Amit Singh (Addison-Wesley, 2007, Pearson Education, Inc.); these pages are incorporated herein by reference. A function's stack frame is "lost" when the function completes/exits and returns control to its caller. Hence, the local variables in the scope of the function are not retained valid in the stack after the function returns control to the caller of the function. A programmer can decide to avoid use of the stack by defining variables as global variables or by using a call, such as malloc, to allocate space for data in the heap memory structure; in this case, the stack is avoided (but can still be used for functions which use local variables that do not need to persist outside of their respective scope).

Programmers often desire to use a function or data structure known as a closure. A closure is a function that is evaluated in an environment containing zero or more bound variables. When called, the function can access these variables. In some languages, a closure may occur when a function is defined within another function, and the inner function refers to local variables of the outer function. At run-time, when the outer function executes, a closure is formed and consists of the inner function's code and references to any variables of the outer function required by the closure. Memory allocation in the prior art causes the closure and all bound local variables to be initially stored in the heap memory structure (and in this case the closure is always on the heap), although certain compilers attempt to determine if a closure will never need to be stored on the heap, in which case they are allocated, at run-time, on the stack (so in this case the closure is always on the stack). In other cases, a compiler can create run-time code which will automatically migrate a closure from an initial position in the stack to the heap in response to an escape from the closure's lexical scope. In the prior art, recovery of the heap based storage is done through a garbage collector, which is uncommon for C or C based languages.

SUMMARY OF THE DESCRIPTION

In one embodiment of the invention, a method for executing software written in a language, which uses a stack memory structure to store local or automatic variables, includes writing a data structure of a block or closure to the stack memory structure and then executing a block copy process, caused or invoked by a programmer in the creation of the software, to copy the block to a heap memory structure which is configured to store global variables. The block includes a function pointer that references a function which uses data in the block. In at least certain implementations of this method, the block is always initialized to be stored in the stack and a programmer is required to explicitly copy the closure to the heap; this explicit copy may be caused by writing a "block copy" call in the software, and this call at run time will invoke a block copy process or subroutine. Variables in the lexical scope of the closure or block are copied to the heap such that they still work after the lexical scope of the closure's creation is destroyed by returning from the function which created the closure. As a further optimization, certain variables are imported or appended to the closure in the heap as constants. The use of the heap's space may be managed by recovering space through explicit program instructions (e.g. a "block-dispose" call or instruction written by the programmer to match the "block-copy" call or instruction for a block) or through garbage collection techniques or through a combination of both.

Another aspect of this description relates to debugging when blocks or closures are present in the software being debugged. Source level debugging is a process of examining a program and providing data, where possible, on command, of where the instruction counter(s) are with respect to the original source as well as, potentially, the current data values of variables within that source program. A block, in one embodiment, includes a data block with a specialized function pointer that references a function that knows and uses the layout of that data block for computation according to the syntax of the block. A block can appear to a debugger as an opaque data structure that can be invoked like a function. The debugger may not be able to display the data in the opaque data structure, and it is desirable to provide a way for the debugger to display this data. In at least certain embodiments, one way for the debugger to display this data is to associate the specialized layout of the block with the specialized function that is referenced by the block. The data layout definitions are keyed to the specialized function referenced by the block. The debugger finds the specialized function within the otherwise opaque data structure of the block and can then use conventional debugger lookup functions to find and display the specialized layout information for that block.

Another aspect of this description relates to defenses against viruses and other malicious code. In order to prevent viruses and other malicious code from harming a computation it is necessary to not allow writeable data to be used as executable instructions. There is a common need and use of compiler generated thunks to recover or initialize extra data before calling specific functions. This allows the functions to appear to take fewer arguments than are necessary yet be supplied with the correct and complete amount of data. The prior art often requires that each such thunk be allocated on its own page of memory such that it can start with writeable permission, be written upon with instructions to recover specific data, and then having the page marked as not writeable and executable, and depending on the architecture of the processor, the processor's instruction cache is flushed; these operations in the prior art are computationally expensive. Since each thunk requires a page of memory, these thunks need to be tracked and deallocated in many implementations. Uses of such thunks include "inner functions" in GNU C compiler (GCC) and certain implementations of closures. At least certain embodiments of the invention provide an efficient way to use thunks by allocating paired chunks of memory and on one chunk of the pair write a series of small thunks that dereference a data area counterpart on the other chunk in the pair. Once written, the memory is protected as execute only and each thunk-data pair in the series is separately allocated and restored. Each thunk-data pair is provided as part of a thunk allocation which also takes the extra data that needs to be recovered. The extra data is stored in the appropriate location in the writeable chunk of memory. The instructions that are written vary according to the needs of the compiler or client and can be as simple as pushing the extra data as an extra stack argument.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Examples of methods for writing, compiling, and executing software which includes one or more block structures are provided in this description in the context of a language which uses a stack memory structure to store local or automatic variables. Examples of such languages include the language C, C++, and Objective C and other C-like procedural languages, including Java, etc. The block includes a function pointer that references a function which uses data in the block. In at least certain embodiments, the block is always initialized to be stored in the stack and the programmer is required to explicitly copy the block to the program's heap, and this explicit copy operation may be caused by writing an indication, such as a call or a directive or an instruction, to cause a block copying operation to be performed at run-time. A heap memory structure may be implemented in a variety of different ways including a tree structure, as is known in the art.

Figure 1:
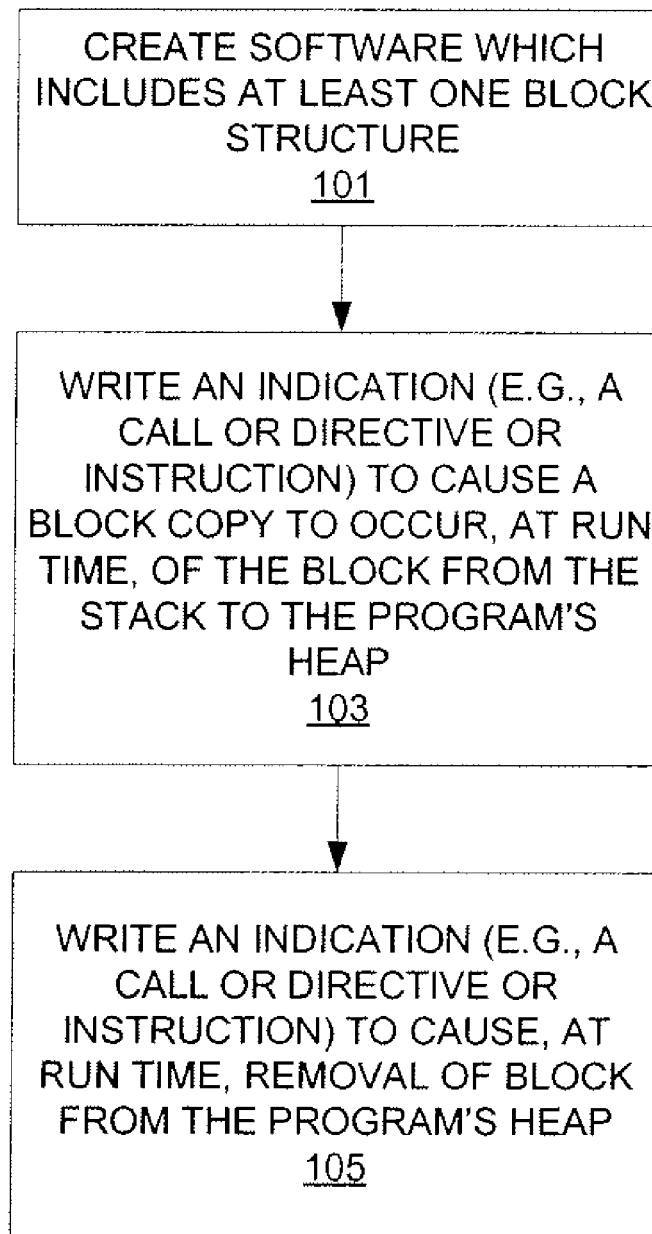
FIG. 1 is a flow chart of an example of a method performed by a programmer according to one embodiment of the invention.
Figure 2:
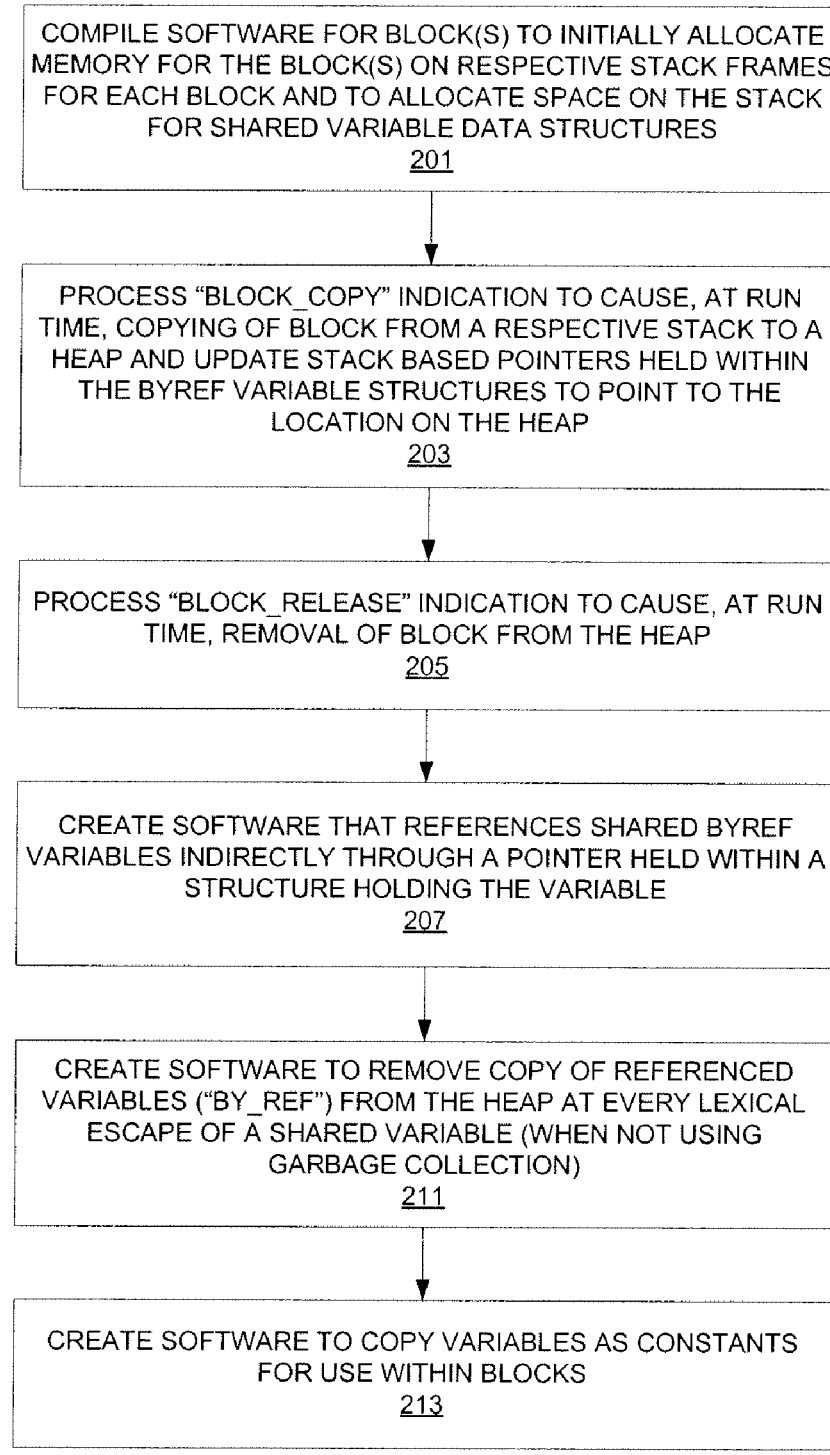
FIG. 2 is a flow chart of an example of a method performed by a compiler according to one embodiment of the invention.
Figure 3:
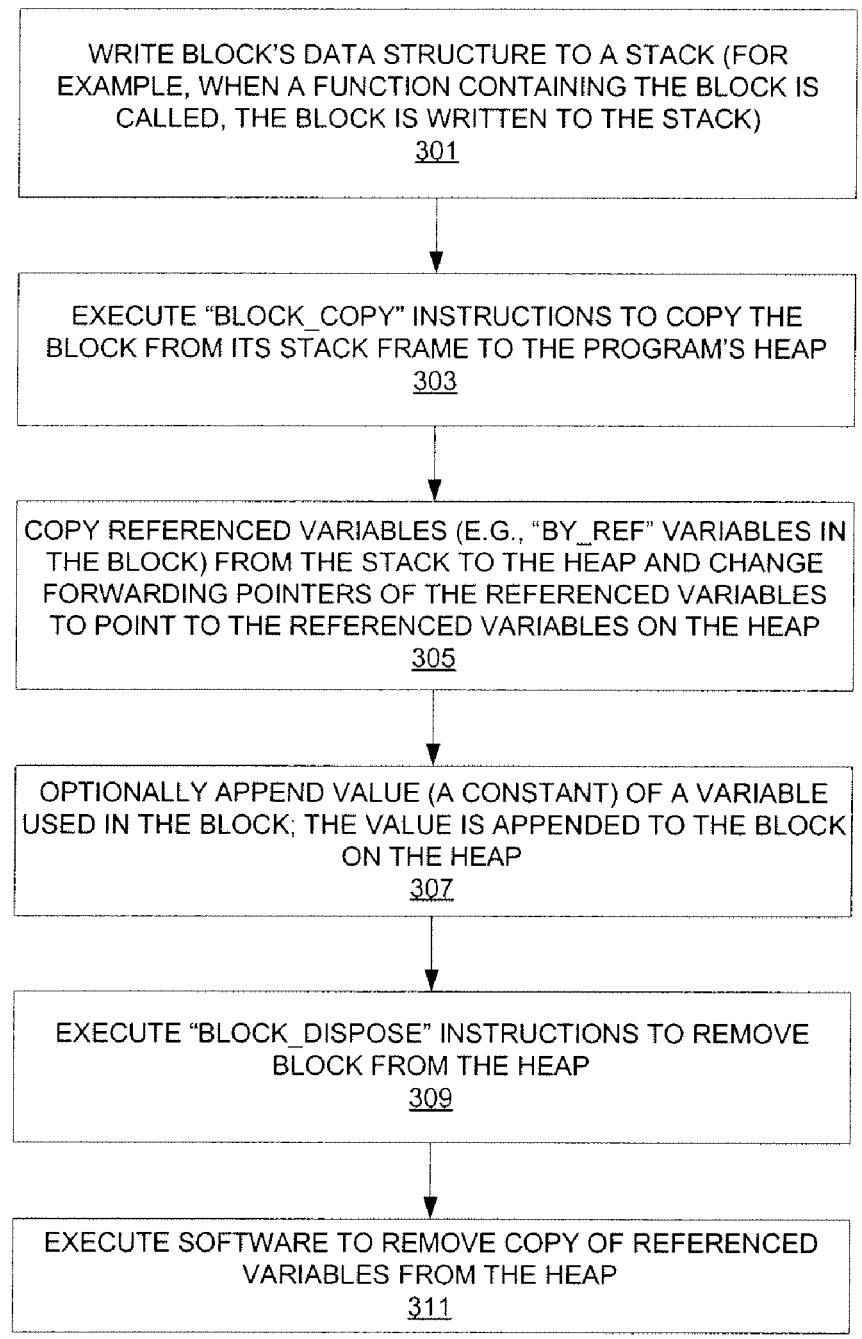
FIG. 3 is a flow chart showing an example of the run-time execution of software containing blocks according to one embodiment of the invention.

FIG. 1 shows an example of a method performed by a programmer during the creation of software which includes at least one block structure. While the software is being created in operation 101, the programmer writes an indication, in operation 103, which causes a block copy to occur, at run-time, of the block from a stack to the program's heap. This indication may be implemented in a variety of different ways. For example, it may be a call to a shared run-time routine which is accessed from the program via a normal subroutine call. Another implementation may have the compiler recognize the directive and to compile the block copy code in a so called "inline" manner. There are other choices known to those skilled in the art. In at least certain embodiments, the programmer may also be required to write an indication to cause, at run-time, the removal of the block from the program's heap. This is shown in operation 105 in FIG. 1. In alternative embodiments, the compiler may provide a warning or error message if no such indication is found in the software for the corresponding block. In at least certain embodiments, there should be a match, for each block, of the indication to cause a block copy and an indication to cause, at run-time, the removal of the block from the program's heap when the processing of the block has been completed. After the software has been completed, the programmer causes the compiler to process the software in order to create an executable version of the software which can run at run-time. FIG. 2 represents an example of a method for compiling such software, and FIG. 3 shows an example of the execution at run-time of such software.

The operations shown in FIG. 2 may be performed by a compiler in the sequence shown in FIG. 2 or in an alternative sequence which has the operations in a different order or sequence. Further, the compiler may perform fewer operations or additional operations. Moreover, some of the operations may be performed previously to create shared run-time routines or libraries which are linked in at run-time, and hence these operations may not need to be performed when compiling the software. It will be appreciated that the block and the function it references may contain only local or automatic variables and yet the compiler can perform the necessary operations to create executable software which operates properly at run-time. It will also be understood that in certain embodiments, several of the operations may be merged.

In operation 201 of FIG. 2, the software is compiled to initially allocate memory for the block on a respective stack frame for the block. The compiler may also allocate space on the stack for a shared variable data structure by recognizing "by reference" variables used within a block, and for each, preparing memory space for each within a shared variable data structure. The shared variable data structure, which may be referred to as a by_ref (or byref) data structure, may include a forwarding pointer, initially set to refer to itself, for the variable, a count of the number of active uses of the shared variable when not running in a garbage collection system, and data used to assist a shared subroutine implementation of a block copy process in determining if the data structure is on the heap or is on the stack, and also additional information regarding any supplementary actions that need to be performed upon the variable when it is copied or disposed, as necessary, depending on the language or if a garbage collection system is not present and the variable requires such memory management support, such as calls to adjust shared variable reference counts or other memory management instructions. For each block that uses a variable in a shared variable data structure, there is data within the block on the stack with a reference to the stack based variable structures that it will use.

In operation 203, the compiler processes any indication, entered by the programmer, to cause a block copy operation at run-time, which will copy the block from a respective stack to a heap and to cause an updating of stack based pointers held within the byref variable structures to point to the location on the heap. In one embodiment, the compiler may process a call to a block copy subroutine in a shared run-time library which performs the block copy of the block from the stack to the program's heap. It will be understood that, in a typical embodiment, only the first indication within the program will cause the copy of the block from the stack to the heap and further indications do not cause additional copies of the block to be created on the heap. In operation 205, the compiler processes a block release indication to cause, at run-time, removal of the block from the heap. In one embodiment, the block release indication was entered by the programmer in writing the software according to a rule which requires that for every block copy indication for a particular block, there should be a block release indication. In alternative embodiments, the compiler may display an error message should such block release indication not be present. The block release indication should be placed in an appropriate location within the software such that the block is released after the completion of execution of the block.

In operation 207, the compiler creates software that references shared byref variables indirectly through a pointer held within a structure holding the variables. In operation 211, the compiler creates software (e.g. a call to a run-time routine) to remove a copy of the shared byref variable data structure from the heap at every lexical escape of a shared variable, when the run-time system is not using a garbage collector. The code generator in operation 211 may, in one embodiment, be a call to a "byref_block_release" function that actually recovers the storage in the heap if after decrementing a reference count it finds the count at zero. Operation 213 performs an optional method which can be used to copy variables as constants for use within a block. In another embodiment, these variables may not be treated as constants ("const"), but although they may be changed the effects of the change would not be shared. It will be understood that this is an optimization procedure in which certain variables are imported into the block as constants. This can be performed at the programmer's discretion by having the variable named by value which causes the software created in operation 213 to append the constant to the data block structure on the heap during run-time (as shown in operation 307).

Figure 4A:
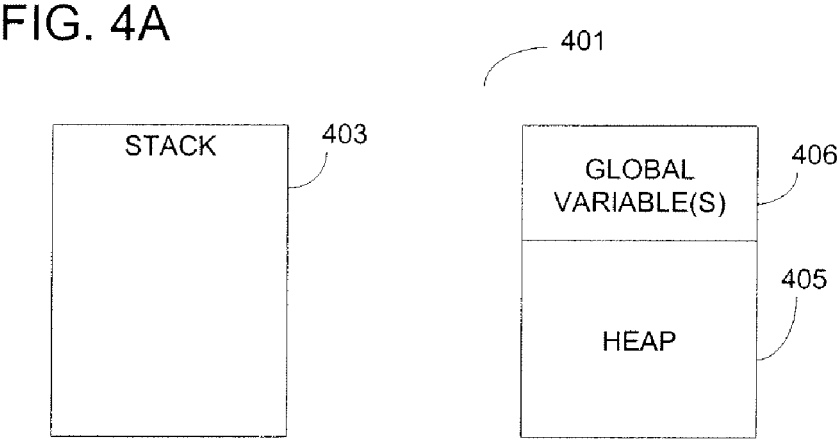
FIGS. 4A, 4B, and 4C show representations of stack and heap memory structures at run-time at different times during run-time according to certain embodiments of the invention.
Figure 4B:
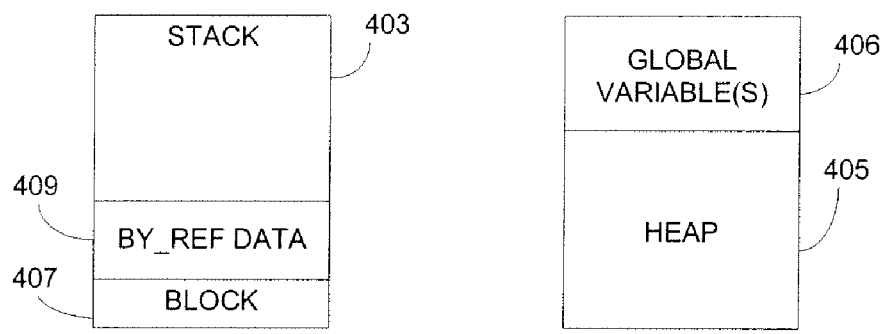
Figure 4C:
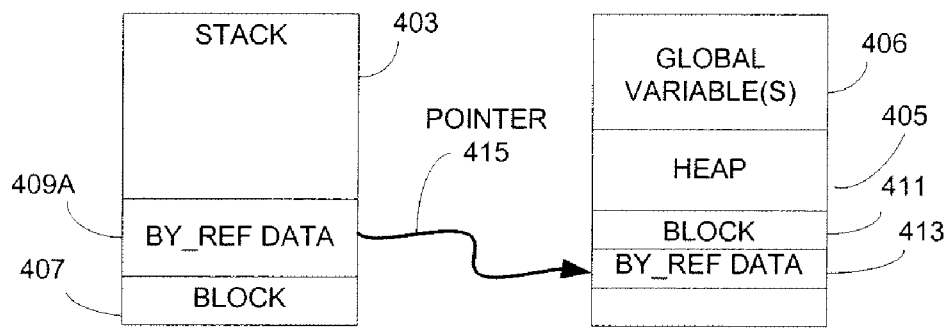

The method shown in FIG. 3 occurs when the compiled software is executed. Operation 301 is performed when a function containing a block is called or when a new lexical scope within a function is entered that itself contains a block. In one embodiment, a shared run-time library or routine may be called to perform operation 301 to write the block to the stack. This can be seen in FIGS. 4A and 4B which show a stack 403 for a program and a heap 405 for the program. The stack, as shown in FIG. 4A, is empty and then, as shown in FIG. 4B, is written to in order to store the block 407 into the stack 403. In operation 303, the block copy instructions are executed in order to copy the block from its stack frame to the program's heap. This executing of the block copy operation typically occurs before the escape from a lexical scope from the block and is not performed in response to an escape from that scope. In operation 305, referenced variables, such as shared variable data structures, are copied from the stack to the heap and the forwarding pointers for those reference variables are also changed to point to the referenced variables on the heap. For example, as shown in FIG. 4C, the by_ref data 413 has been copied to the heap and the forwarding pointer 415 points to that data on the heap. The by_ref data 413 is a copy of the shared variable data structure 409A within the stack 403.

As noted above, an optional operation may be performed to append a constant, which replaces a variable, by appending the constant to represent the variable to the block's data structure on the heap.

Operation 309 and 311 are performed at run-time in order to release memory from the heap for both the block data structure and the shared variable data structure. The execution of the block dispose instructions, which may be called by the block release indication specified as part of operation 205, cause the removal of the block from the heap. The programmer will typically place this call at the appropriate point in the program when the block is no longer needed or else rely on garbage collection if present to recover the heap memory. Operation 311 may be automatically performed to remove a copy of the shared variable data structure; this operation may be caused to occur by a compiler inserting calls to a routine at every place where the code which uses the shared variable data structure exits or where the variable goes out of scope.

One embodiment of the run-time embodiment of the invention may manage memory recovery by requiring the programmer to include calls to the block dispose subroutine. Hence, memory recovery is self-managed rather than being managed by an automatic garbage collection system. However, in other embodiments, garbage collection routines may be utilized, in which case the garbage collection systems manages the block release instructions.

Figure 5:
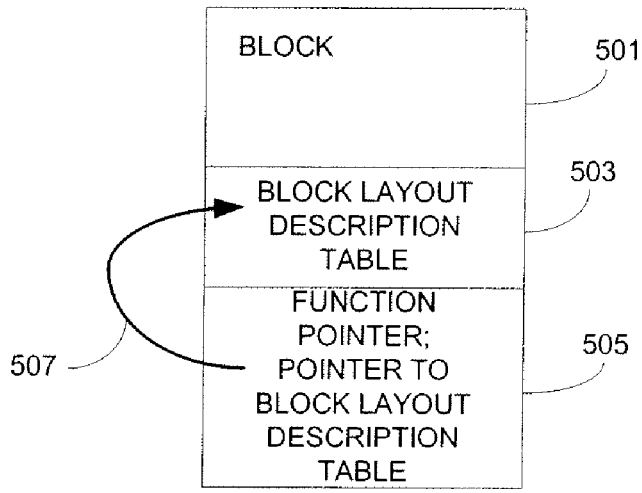
FIG. 5 shows a representation of a block according to an embodiment of the invention which supports debugging.

Another aspect of the present invention relates to debugging when blocks or closures are present in software being debugged. A block in one embodiment includes a data block with a specialized function pointer that references a function that knows and uses the layout of that data block for computation according to the syntax of the block. A block can appear to a debugger as an opaque data structure that can be invoked like a function. Hence, the debugger may not be able to display the data in the opaque data structure, and it may be desirable to provide a way for the debugger to display this data. In at least certain embodiments, one way for the debugger to display this data is to associate the specialized layout of the block with the specialized function that is referenced by the block. One association is shown in FIG. 5 in which a function pointer is stored with a pointer to the layout description table. In this case, the block 501 includes a block layout description table 503 which defines the data layout definitions of the data within the block. The function pointer 505 includes a pointer to the layout description table. This allows for an association between the specialized function referenced by the block and the data layout definitions which are key to the specialized function.

Figure 6:
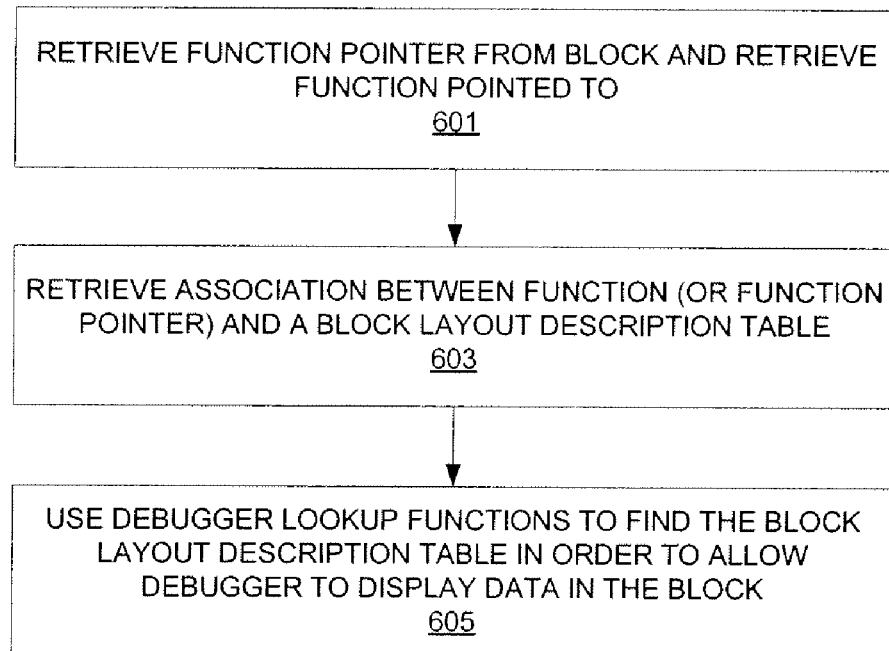
FIG. 6 shows an example of a method for debugging software which includes blocks according to one embodiment of the invention.

FIG. 6 shows an example in a debugging method for using the association between a function and a block layout description table. In operation 601, the function pointer can be retrieved from the block by the debugger which can then be used to retrieve the block layout description table using conventional debugger lookup functions in operation 605. This will permit the debugger to find and display the specialized layout information for the block so that the programmer can understand how the block is used relative to the function referenced by the block, etc.

Following is an example of a formal specification of blocks according to one implementation.

The Block Type

A new type is introduced to C and by extension Objective-C, C++, and Objective-C++. The type is a pair consisting of the result value type and a list of parameter types very similar to a function type.

The string "int(^)(char, float)" describes the type of a Block that has a result value of type int and two parameters, the first of type char and the second of type float.

Block Declarations

A Block type is declared using function pointer style notation but substituting ^ for *. The following are all valid Block types:

```
void ( ^ )(void)
int ( ^ )(int, char)
```

Variadic '...' arguments are supported. A Block that takes no arguments must specify void in the argument list. An empty parameter list does not represent, as K&R provide, any argument list.

Operations

There is one operation on Block types, invoking them with a type checked set of parameters and simultaneously extracting a result value.

Blocks are invoked with a list of expression parameters of types corresponding to the declaration.

Objective-C extends the definition of a Block type to be that also of id. A variable or expression of Block type may be messaged or used as a parameter wherever an id may be. The converse is also true.

All Blocks are constructed to be Objective-C objects regardless of whether the Objective-C run-time is operational in the program or not.

Implementation

A Block is implemented as a structure that starts with the following fields.

```
enum {
    BLOCK_NEEDS_FREE =        (1 << 24),
    BLOCK_HAS_COPY_DISPOSE =  (1 << 25),
    BLOCK_IS_GC =             (1 << 27),
};
struct Block_basic {
    void *isa; // initialized to &_NSConcreteStackBlock
    int Block_flags;  // int32_t
    int Block_size; // XXX should be packed
    into Block_flags
    void (*Block_invoke)(void *); // really a function
pointer returning the correct type and taking the appropriate args
    void (*Block_copy)(void *dst, void *src);
    void (*Block_dispose)(void *);
};
```

Compiler generated code for invoking a Block can extract the invoke function pointer and call it passing the Block data structure and all additional parameters.

```
(x->Block_invoke)(x,  'a');
((*y)-> Block_invoke)(*y,  'a');
```

Note that if the Block returns a value, such as a structure, that is passed via a hidden argument in the ABI (Application Binary Interface), the normal ABI conventions are followed. Thus, a raw Block pointer, just like a raw function pointer, cannot be correctly invoked without knowing its return value type.

Block Literal

A Block literal is created by the new use of the ^ token as a unary operator. The form is, generally, the ^ symbol followed by the parenthesized list of expression parameters, and a code body. The return type is inferred from the type of the return statement expression. The code body is that of a compound statement. The list must appear before the first statement (if any) and is itself enclosed by | tokens. Examples:

```
int x, y;
    _block int z;
^ ( void ) {
        z = x + y;
}
```

Local automatic (stack) variables referenced within the compound statement of a Block are imported and captured by the block. Global variables and references to global functions are treated normally. A variable declared with the _block storage specifier is moved by the compiler into a special on-stack structure that can, if needed, be copied to a heap based memory location while still being shared by both the function that defines it and all Blocks that reference it. Local variables not marked with _block are imported as const copies of their values at the time the Block expression is formed.

The compound statement body of a Block establishes a new lexical scope such that new local variables may be defined. Other variable references are to the definition point in the closest enclosing lexical scope. A local variable defined in a Block may be referenced as either a const import or by_reference in a subsequent Block.

Objective-C extends the definition to allow the use of the names of instance variables when a Block expression is formed in an appropriate instance method (Class methods have no access to instance variables). If instance variables are referenced then a const import of the self variable is made and all accesses within the Block are via the imported const version of self. There is no similar provision for C++ because it is not likely to be desirable to form a const zero-argument constructor copy of this.

Constant Imports

In the example above the values x and y are implicitly imported into the compound statement as const variables. The basic structure is augmented as

```
struct {
    struct Block_basic base;
    const int x;
        const int y;
        ...; // byref reference to z
}
void _Block_copy_assign(struct Block_basic **dest, const struct
Block_basic *src);
void _Block_destroy(const struct Block_basic *src);
```

This structure is allocated on the stack and the fields x and y are initialized to the values of x and y variables at the point of declaration. C scalars, structures, references, and Blocks are simply assigned as simple initialization assignment.

Blocks support persistence by way of the run-time helper function _Block_copy( ). The compiler provides assistance in copying for variables of types Objective-C objects, Blocks, by_reference variables, and C++ stack objects. There are two additional helper routines synthesized for use by _Block_copy, if needed, and if present, Blocks_flags is marked with BLOCK_HAS_COPY_DISPOSE. The first is the copy helper which takes the new and the existing Block data structure. Objective-C object pointers are sent the -retain message unless the -fobjc-gc-only flag is set, and they are assigned using the objc_assignStrongCast( ) operation if -fobjc-gc or -fobjc-gc-only flag is set. Block variables are copied using the specific objc run-time helper function _Block_copy_assign. C++ objects are copied using the default copy constructor.

Similarly the compiler provides a destruction helper function that is passed the Block data structure. Objective-C objects are sent the -release message unless the -fobjc-gc-only flag is set. Block variables are passed to a support routine _Block_destroy, and C++ objects have their appropriate destructors synthesized.

By Reference Parameters

By_ref parameters (those marked with _block) are limited to automatic variables of an enclosing scope. Conceptually, every local variable that is imported as a by_reference variable in any block in that scope, including that of the function/method, is actually allocated on the stack as a member of its own unique structure. This structure will be copied to a heap if one of the Blocks that references this variable is copied using Block_copy( ). To support continued access to this variable as it is copied, the structure contains a forwarding pointer that is initially set to the start of this structure, and all accesses to that variable are made indirectly through the forwarding pointer.

After the point of last use and before escape from the enclosing scope a call to a run-time dispose function Block_destroy_byref( ) is made upon the structure.

The layout of the shared storage is

```
struct Block_byref {
    long reserved;
    struct Block_byref *forwarding;
    int flags;
    int size;
    void (*byref_keep)(struct Block_byref *dst, struct Block_byref *src);
    void (*byref_destroy)(struct Block_byref *);
    // long shared[0];
};
```

The copy and destroy helper routines synthesized for a Block must also, for each such shared structure containing a shared by_reference variable, emit a copy helper function call _Block_byref_assign_copy to preserve (if necessary) the shared data structure by copying it to the heap. And in the destroy helper it must call _Block_byref_release( ) to help recover the heap reference.

Similar to the case of constant imported variables, if variables of types Objective-C objects, Blocks, or C++ stack variables are named in by_reference sections, they need support help from the compiler for when they are copied to the heap. The support help is identical to that of const imports, except that the destinations are not typed or treated as const variables. The flags word of the Block_byref structure should be marked with BLOCK_HAS_COPY_DISPOSE if such helper routines are present.

C++ stack objects continue to require destructors despite their enclosure in the stack based structure.

The idea here is that all stack based Blocks share a stack based byref data structure. The byref data structure initially holds non-retained objects and Blocks. Upon copy, the run-time arranges to mark the copy as a copy and to properly retain its components.

A byref storage structure is conceptually required for each variable shared in any reachable Block.

Note: All variables used as by_reference variables in the same set of Blocks may share the same shared storage structure.

Control Flow

The compound statement of a Block is treated much like a function body with respect to control flow in that gotos, breaks, and continues do not escape the Block. Exceptions are treated "normally" in that when thrown they pop stack frames until a catch clause is found.

Local Variables

The scope of local variables is that of a function—each activation frame contains a new copy of variables declared within the local scope of the Block. Such variable declarations should be allowed anywhere rather than only with C99 or gnu specific flags, including for statements.

There are no "Block" lifetime scoped variables that persist across multiple invocations. This would likely require a way to specify finalization logic for when the Block was recovered.

Figure 7:
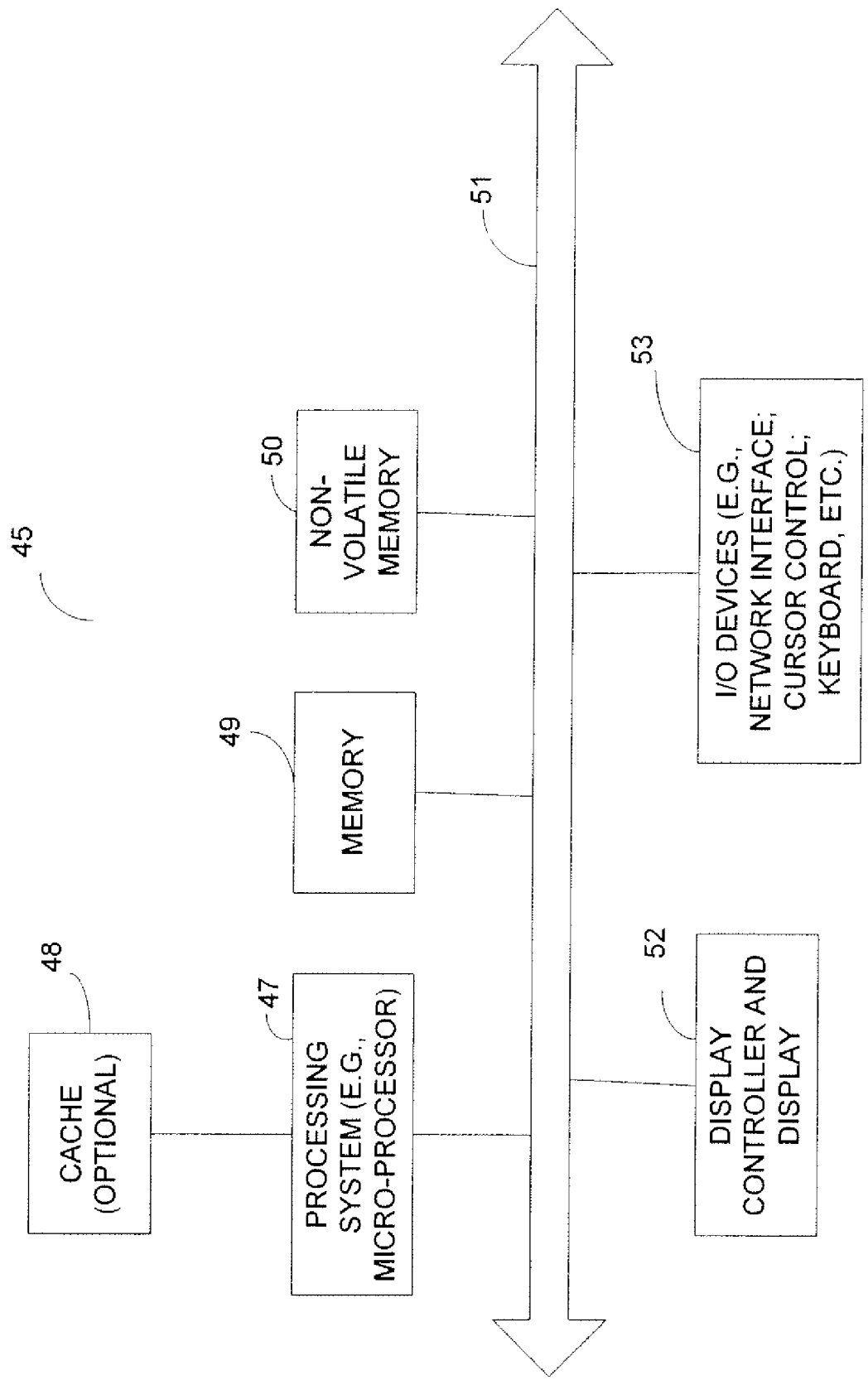
FIG. 7 shows an example of a data processing system which may be used in at least some embodiments of the invention.

FIG. 7 shows one example of a typical computer system which may be used with the present invention. Note that while FIG. 7 illustrates various components of a computer system, it is not intended to represent any particular architecture or manner of interconnecting the components as such details are not germane to the present invention. It will also be appreciated that personal digital assistants (PDAs), cellular telephones, handheld computers, media players (e.g. an iPod), entertainment systems, devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 7 may, for example, be a Macintosh computer from Apple Inc. The system may be used when programming or when compiling or when executing the software described.

As shown in FIG. 7, the computer system 45, which is a form of a data processing system, includes a bus 51 which is coupled to a processing system 47 and a volatile memory 49 and a non-volatile memory 50. The processing system 47 may be a microprocessor from Intel which is coupled to an optional cache 48. The bus 51 interconnects these various components together and also interconnects these components to a display controller and display device 52 and to peripheral devices such as input/output (I/O) devices 53 which may be mice, keyboards, modems, network interfaces, printers and other devices which are well known in the art. Typically, the input/output devices 53 are coupled to the system through input/output controllers. The volatile memory 49 is typically implemented as dynamic RAM (DRAM) which requires power continually in order to refresh or maintain the data in the memory. The nonvolatile memory 50 is typically a magnetic hard drive, a flash semiconductor memory, or a magnetic optical drive or an optical drive or a DVD RAM or other types of memory systems which maintain data (e.g. large amounts of data) even after power is removed from the system. Typically, the nonvolatile memory 50 will also be a random access memory although this is not required. While FIG. 7 shows that the nonvolatile memory 50 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 51 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a machine readable storage medium such as a memory (e.g. memory 49 and/or memory 50). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 47.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium storing executable program instructions which when executed by a data processing system cause the data processing system to perform a method comprising:
    executing software written in a language which uses a stack memory allocation technique to store local or automatic variables, the software configured to:
        write a data structure of a block to a stack memory structure before executing block copy instructions, the block including a function pointer that references a function which uses data in the block;
        execute block copy instructions, caused to be invoked in the writing of the software, to copy the block from the stack memory structure to a heap memory structure which is configured to store global variables, and wherein a variable referred to in the block is copied from the stack memory structure to the heap memory structure and a pointer for the variable referred to in the block is changed to point to the variable copied to the heap memory structure instead of the stack memory structure.

2. The medium as in claim 1 wherein the block includes data in a block's syntax and the function is configured to recognize and use the data in the block's syntax.

3. The medium as in claim 1, the software further configured to:
    append a constant to represent a variable in the block, the constant being appended to the block in the heap memory structure.

4. The medium as in claim 1, the software further configured to:
    execute instructions to remove the block from the heap memory structure;
    execute instructions to remove the variable copied to the heap memory structure.

5. The medium as in claim 4 wherein the instructions to remove the block were added by a programmer during the writing of the software and the instructions to remove the variable were added automatically by a compiler during compilation of the software.

6. A data processing system comprising:
    a memory comprising
        a stack memory structure, and
        a heap memory structure configured to store global variables; and
    a processor coupled to the memory, the processor operable to execute software written in a language which uses a stack memory allocation technique to store local or automatic variables, wherein the processor writes a data structure of a block to the stack memory structure and executes block copy instructions, caused to be invoked in the writing of the software, to copy the block from the stack memory structure to the heap memory structure, wherein the block includes a function pointer that references a function which uses data in the block, and wherein a variable referred to in the block is copied from the stack memory structure to the heap memory structure and a pointer for the variable referred to in the block is changed to point to the variable copied to the heap memory structure instead of the stack memory structure.

7. The data processing system as in claim 6, wherein the block includes data in a block's syntax and the function is configured to recognize and use the data in the block's syntax.

8. The data processing system as in claim 6, wherein the software is configured to always initialize the block to the stack memory structure before executing the block copy instructions.

9. The data processing system as in claim 6, wherein the processor appends a constant to represent a variable in the block, wherein the constant is appended to the block in the heap memory structure.

10. The data processing system as in claim 6, wherein the processor executes a first set of instructions to remove the block from the heap memory structure and further executes a second set of instructions to remove the variable copied to the heap memory structure.

11. The data processing system as in claim 10, further comprising:
    a compiler to compile the software and to automatically add the second set of instructions during compilation of the software, wherein the first set of instructions has been added to the software during writing of the software.

12. A computer-implemented method to compile software into executable code, the method comprising:
    allocating a portion of a stack memory structure to a block, the block including a function pointer that references a function which uses data in the block;

adding block copy instructions to the executable code, in response to a block copy indication in the software, wherein the block copy instructions, when executed by a processor, causes the processor to copy the block from the stack memory structure to a heap memory structure configured to store global variables, and wherein a variable referred to in the block is copied from the stack memory structure to the heap memory structure and a pointer for the variable referred to in the block is changed to point to the variable copied to the heap memory structure instead of the stack memory structure.

13. The method as in claim 12, wherein the block includes data in a block's syntax and the function is configured to recognize and use the data in the block's syntax.

14. The method as in claim 12, wherein the software is configured to always initialize the block to the stack memory structure before executing the block copy instructions.

15. The method as in claim 12, the method further comprising:
adding block release instructions to the executable code, in response to a block release indication in the software, wherein the block release instructions, when executed by a processor, causes the processor to remove the block from the heap memory structure.

16. A machine-readable non-transitory storage medium storing executable program instructions which when executed by a data processing system cause the data processing system to perform a method to compile software into executable code, the method comprising:
allocating a portion of a stack memory structure to a block, the block including a function pointer that references a function which uses data in the block;
adding block copy instructions to the executable code, in response to a block copy indication in the software, wherein the block copy instructions, when executed by a processor, causes the processor to copy the block from the stack memory structure to a heap memory structure configured to store global variables, and wherein a variable referred to in the block is copied from the stack memory structure to the heap memory structure and a pointer for the variable referred to in the block is changed to point to the variable copied to the heap memory structure instead of the stack memory structure.

17. The medium as in claim 16 wherein the block includes data in a block's syntax and the function is configured to recognize and use the data in the block's syntax.

18. The medium as in claim 16, wherein the software is configured to always initialize the block to the stack memory structure before executing the block copy instructions.

19. The medium as in claim 16, the method further comprising:
adding block release instructions to the executable code, in response to a block release indication in the software, wherein the block release instructions, when executed by a processor, causes the processor to remove the block from the heap memory structure.

* * * * *